United States Patent
Zhangsheng et al.

(10) Patent No.: US 10,252,612 B2
(45) Date of Patent: Apr. 9, 2019

(54) FUEL TANK FILL ASSEMBLY

(71) Applicant: Stant USA Corp., Connersville, IN (US)

(72) Inventors: Zhao Zhangsheng, Suzhou (CN); Paul C. Wetzel, Oxford, OH (US)

(73) Assignee: Stant USA Corp., Connersville, IN (US)

( * ) Notice: Subject to any disclaimer, the term of this patent is extended or adjusted under 35 U.S.C. 154(b) by 141 days.

(21) Appl. No.: 15/454,391

(22) Filed: Mar. 9, 2017

(65) Prior Publication Data

US 2017/0259665 A1    Sep. 14, 2017

Related U.S. Application Data

(60) Provisional application No. 62/307,139, filed on Mar. 11, 2016.

(51) Int. Cl.

| F16L 3/22 | (2006.01) |
|---|---|
| B60K 15/04 | (2006.01) |
| B23K 31/02 | (2006.01) |
| B23K 101/10 | (2006.01) |
| B60K 15/03 | (2006.01) |

(52) U.S. Cl.
CPC .............. *B60K 15/04* (2013.01); *B23K 31/02* (2013.01); *B23K 2101/10* (2018.08); *B60K 2015/0346* (2013.01); *B60K 2015/047* (2013.01); *B60K 2015/0474* (2013.01); *F16L 3/22* (2013.01)

(58) Field of Classification Search
CPC ...... B60K 2015/0346; B60K 2015/047; B60K 2015/0474
USPC ............ 138/106; 29/460; 248/214, 68.1, 65; 285/124.1
See application file for complete search history.

(56) References Cited

U.S. PATENT DOCUMENTS

| 4,304,822 A * | 12/1981 | Heyl ................. B05D 1/30 138/146 |
|---|---|---|
| 4,500,399 A * | 2/1985 | Hart ................. C25D 13/20 204/488 |
| 6,099,908 A | 8/2000 | Hirano |
| 6,610,422 B1 * | 8/2003 | Ooi .................. B05D 7/546 148/530 |
| 7,367,101 B2 | 5/2008 | Takahashi et al. |
| 9,776,501 B2 * | 10/2017 | Dominic ............. B60K 15/01 |
| 2017/0089491 A1 * | 3/2017 | Kito ................. F16L 55/035 |

* cited by examiner

*Primary Examiner* — Patrick F Brinson
(74) *Attorney, Agent, or Firm* — Barnes & Thornburg LLP

(57) ABSTRACT

A fuel tank fill assembly includes a fuel fill tube adapted to be coupled to a fuel tank and configured to receive fuel discharged by a pump nozzle. The assembly also includes a tube mounting bracket for mounting the fuel fill tube in a stationary position in a vehicle to conduct fuel to the fuel tank.

12 Claims, 6 Drawing Sheets

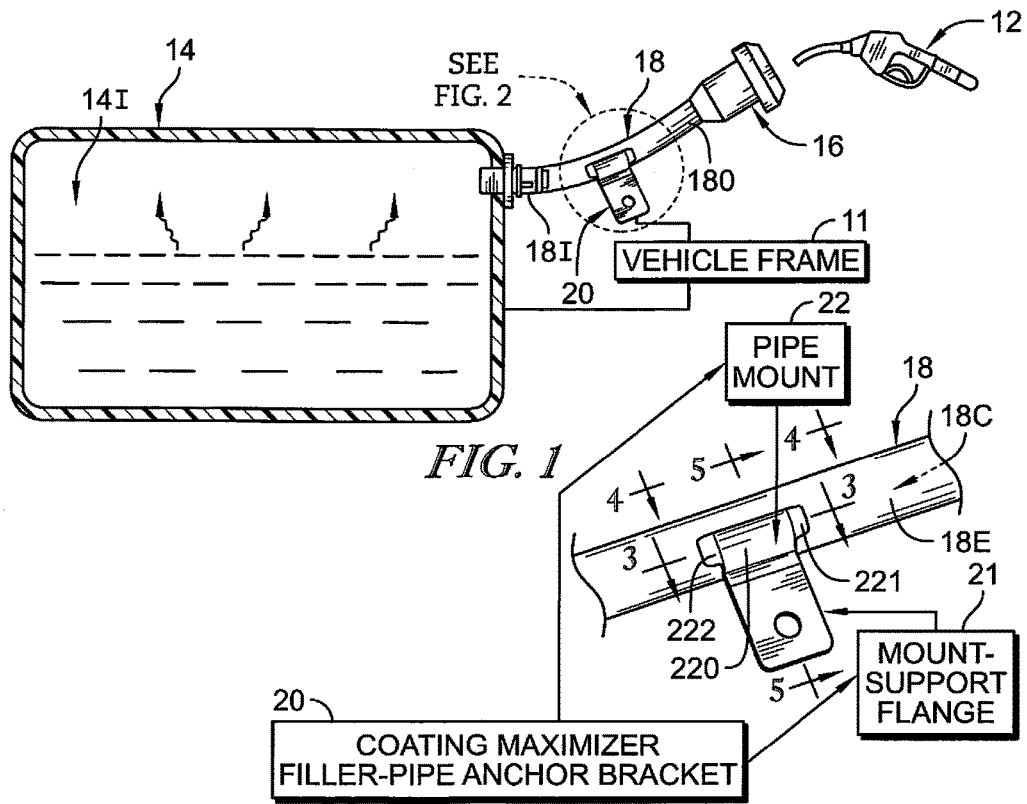
FIG. 1
FIG. 2
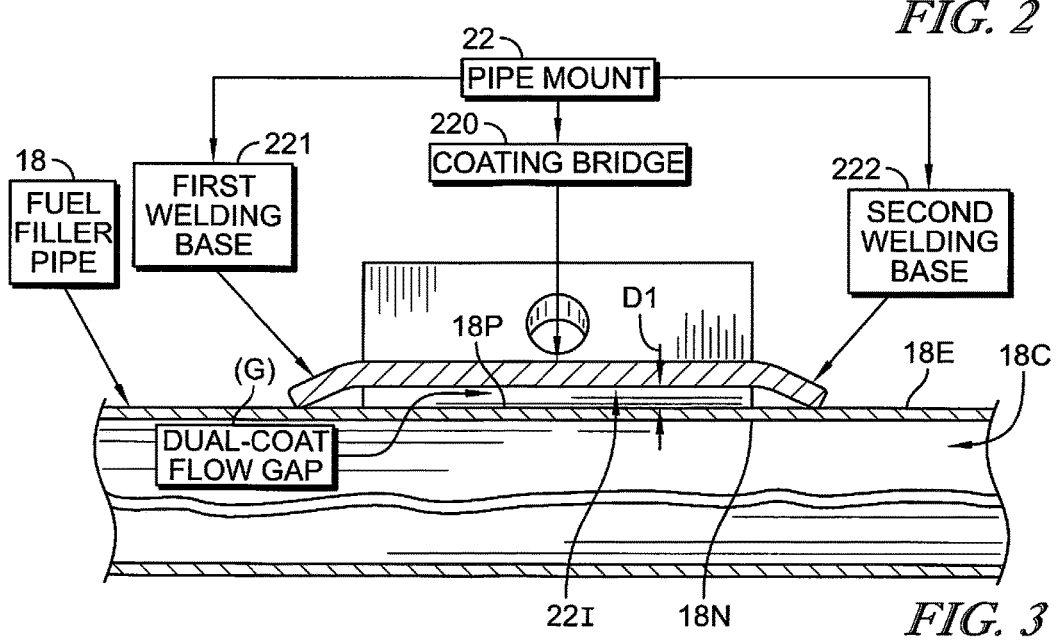
FIG. 3

FUEL TANK FILL ASSEMBLY

PRIORITY CLAIM

This application claims priority to U.S. Provisional Application No. 62/307,139 filed Mar. 11, 2016, the disclosure of which is hereby incorporated herein in its entirety.

BACKGROUND

The present disclosure relates to a fuel tank fill assembly. More particularly, the present disclosure relates to a fuel tank fill assembly for a vehicle fuel tank.

SUMMARY

According to the present disclosure, a fuel tank fill assembly comprises an inlet cup and a fuel filler pipe extending from the inlet cup to a fuel tank. The fuel filler pipe is adapted to conduct liquid fuel from the inlet cup to the fuel tank during refueling.

In an illustrative process in accordance with the present disclosure, a pipe mount of a filler-pipe anchor bracket is mounted on a fuel filler pipe to form a dual-coat flow gap therebetween. Then a first coating material is applied to an exposed inner surface of the pipe mount and an opposed exterior surface of the to establish a first coating layer in the dual-coat flow gap. Subsequently, a second coating material is applied to exposed surfaces of the first coating layer to establish a second coating layer in the dual-coat flow gap. That gap is sized to allow the first and second coating materials to flow into the gap in sequence to establish a multi-layer protective coating on the pipe mount and the fuel filler pipe in the gap.

In illustrative embodiments, the filler-pipe anchor bracket is mounted on the fuel filler pipe to provide a fuel tank fill assembly. The pipe mount of the filler-pipe anchor bracket is coupled to the fuel filler pipe in accordance with the present disclosure to maximize application of a two-layer protective coating to all exposed portions of the pipe mount and the fuel filler pipe and especially in the dual-coat flow gap formed between the pipe mount and the fuel filler pipe so that corrosion of the pipe mount and fuel filler pipe is minimized. The pipe mount is arranged to extend along the fuel filler pipe to accommodate coupling of the filler-pipe anchor bracket to the fuel filler pipe via welds. The filler-pipe anchor bracket also includes a mount-support flange that is coupled to the pipe mount and arranged extend away from the fuel filler pipe to accommodate coupling of the filler-pipe anchor bracket to another component of a vehicle, e.g. a vehicle frame.

In illustrative embodiments, the pipe mount of the filler-pipe anchor bracket is formed to include first and second welding bases that are welded to the fuel filler pipe and a web that extends between the first and second welding bases to provide a coating bridge. The coating bridge is spaced apart from an exterior surface of the filler pipe to form therebetween a dual-coat flow gap in accordance with the present disclosure. The dual-coat flow gap is sized to provide means for allowing a first coating material such as an undercoat zinc-rich primer and a second coating material such as a top-coat anti-corrosion paint to move into the flow gap and coat the interior surface of the pipe mount and opposed exterior surfaces of the fuel filler pipe so that portions of the fuel tank fill assembly in the dual-coat flow gap is protected from corrosive influences during use.

Additional features of the disclosure will become apparent to those skilled in the art upon consideration of illustrative embodiments exemplifying the best mode of carrying out the disclosure as presently perceived.

BRIEF DESCRIPTION OF THE DRAWING

The detailed description particularly refers to the accompanying figures in which:

FIG. 1 is a side elevation view of a fuel system including a fuel tank and a fuel tank fill assembly for conducting fuel into the fuel tank during refueling showing that the fuel tank fill assembly includes an inlet cup, a fuel filler pipe that extends from the inlet cup to the fuel tank, and a coating maximizer filler-pipe anchor bracket mounted to the fuel filler pipe as shown in FIG. 2 in accordance with the present disclosure to provide a dual-coat flow gap that is sized as suggested in FIG. 3 to receive therein a first coating material as suggested in FIG. 7 and then a second coating material as suggested in FIG. 8;

FIG. 2 is an enlarged view of a portion of the fuel tank fill assembly of FIG. 1 showing that the coating maximizer filler-pipe anchor bracket includes a pipe mount arranged to extend along the fuel filler pipe and a mount-support flange coupled to the pipe mount and arranged to extend away from the fuel filler pipe;

FIG. 3 is a sectional view taken along line 3-3 of FIG. 2 showing the pipe mount includes a first welding base welded to the fuel filler pipe, a second welding base welded to the fuel filler pipe, and a coating bridge that extends between and interconnects the welding bases, and further showing that the coating bridge cooperates with an opposed exterior surface of the fuel filler pipe to form a dual-coat flow gap sized to allow an undercoat zinc-rich primer and a top-coat anti-corrosion paint to move into the dual-coat flow gap and coat the exterior surface of the fuel filler pipe and opposed inner surfaces of the pipe mount upon application of the primer and the paint after the filler-pipe anchor bracket has been coupled to the fuel filler pipe so that a multi-layer protective coating is established as suggested in FIGS. 6-8;

FIG. 6 shows welding of the pipe mount to the fuel filler pipe to establish a dual-coat flow gap between an inner surface of the pipe mount and an opposed portion of the exterior surface of the fuel filler pipe;

FIG. 7 shows introduction of a first coating material into the dual-coat flow gap to establish a first coating layer on exposed surfaces of the pipe mount and the fuel filler pipe and also shows application of the first coating material to other exposed surfaces;

FIG. 8 shows subsequent introduction of a second coating material into the dual-coat flow gap to establish a second coating layer on exposed surfaces of the first coating layer and also shows application of the second coating material to other exposed surfaces;

FIG. 9 is a perspective view of a ring-shaped coating maximizer filler-pipe anchor bracket in accordance with the present disclosure;

FIG. 10 is a perspective view of the bracket of FIG. 9 mounted on a companion fuel filler pipe and showing that the bracket includes a pipe mount comprising an annular coating bridge and three welding bases coupled to an inner end of the annular coating bridge and an annular bridge-support flange coupled to an outer end of the annular coating bridge;

FIG. 11 is another perspective view of the assembly shown in FIG. 10; and

FIG. 12 is a sectional view taken along line 12-12 of FIG. 11 showing formation of an annular dual-coat flow gap between an exterior surface of the fuel filler pipe and an opposed inner surface of the annular coating bridge.

DETAILED DESCRIPTION

Figure 4:
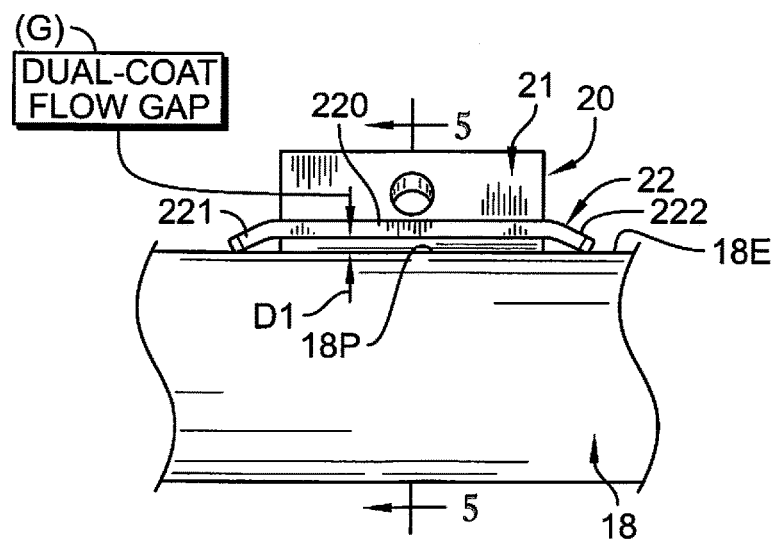
FIG. 4 is a top plan view of a portion of the fuel filler pipe that is coupled to the pipe mount of the coating maximizer, filler-pipe anchor bracket from the point of view suggested in FIG. 2 showing the dual-coat flow gap.
Figure 5:
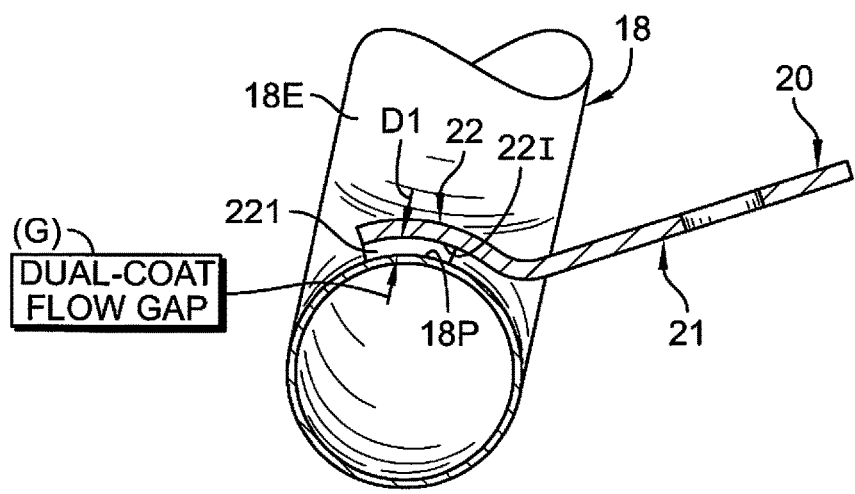
FIG. 5 is a sectional view taken along line 5-5 of FIG. 2 showing the dual-coat flow gap from another point of view.

A fuel fill tank assembly 10 is configured to conduct fuel from a fuel-dispensing pump nozzle 12 to a fuel tank 14 as suggested in FIG. 1. Fuel fill tank assembly 10 includes an inlet cup 16 sized to receive nozzle 12, a fuel filler pipe 18 configured to conduct liquid fuel discharged by nozzle 12 into inlet cup 16 to an interior region 14I of fuel tank 14, and filler-pipe anchor bracket 20 that is made in accordance with the present disclosure and mounted on the fuel filler pipe 18 as suggested in FIG. 2 to establish a dual-coat flow gap (G) therebetween as suggested in FIGS. 3, 5, and 6.

Figure 7:
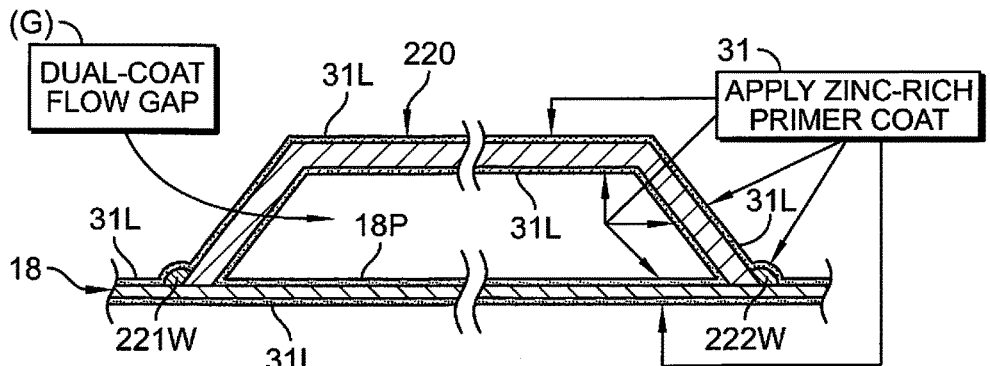
Figure 8:
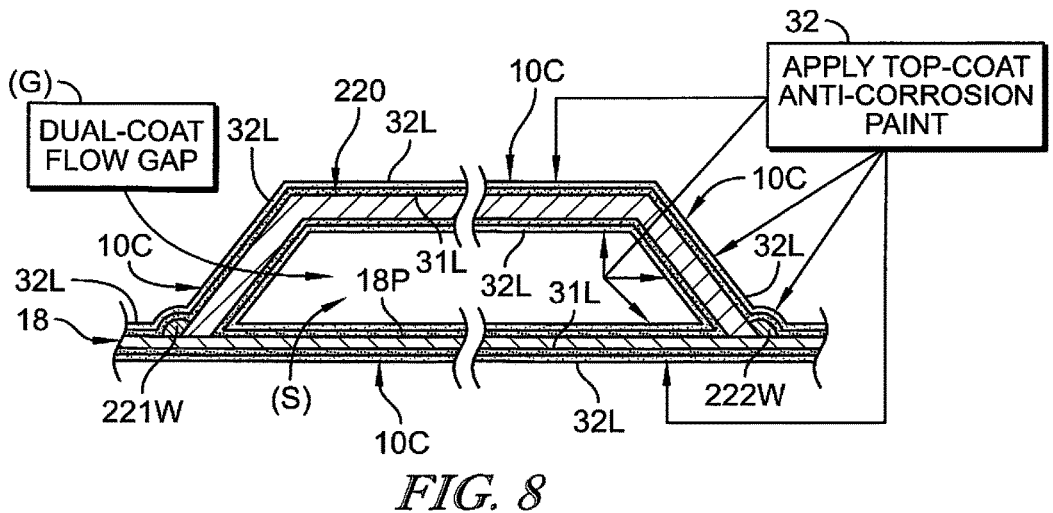

In a two-step coating sequence illustrated in FIGS. 7 and 8, a first coating material 31 flows onto filler-pipe anchor bracket 20 and fuel filler pipe 18 and into dual-coat flow gap (G) to form a first coating layer 31L and then a second coating material 32 flows onto the first coating layer 31L on filler-pipe anchor bracket 20 and fuel filler pipe 18 and into dual-coat flow gap (G) to form a second coating layer 32L. These coating layers 31L, 32L cooperate to form a multi-layer protective coating 10C all over fuel fill tank assembly 10 and inside the dual-coat flow gap (G) associated with fuel fill tank assembly 10 in accordance with the present disclosure.

Fuel filler pipe 18 includes a nozzle-receiving outer end 18O associated with and linked to inlet cup 16 and a fuel-discharging inner end 18I adapted to be coupled to fuel tank 14 to discharge fuel into interior region 14I of fuel tank 14 as shown in FIG. 1. Fuel filler pipe 18 also includes an interior surface 18N arranged to define a fuel-conducting conduit 18C extending between and interconnecting nozzle-receiving outer end 18O and fuel-discharging inner end 18I and an exterior surface 18E arranged to face away from fuel-conducting conduit 18C as shown in FIG. 3.

Coating maximizer filler-pipe anchor bracket 20 includes a mount-support flange 21 and a pipe mount 22 as shown in FIGS. 1-3. Mount-support flange 21 is adapted to be coupled to a vehicle frame 11 to support fuel filler pipe 18 relative to vehicle frame 11 to cause fuel-discharging inner end 18I to communicate with interior region 14I of fuel tank 14. Pipe mount 22 is coupled to mount-support flange 21 and to exterior surface 18E of fuel filler pipe 18 to retain mount-support flange 21 in fixed relation to fuel filler pipe 18. Pipe mount 22 includes an inner surface 22I facing toward exterior surface 18E of fuel filler pipe 18 as shown in FIG. 3.

Multi-layer protective coating 10C covers exposed portions of exterior surface 18E of fuel pipe 18 and inner and outer surfaces 22I, 22O of pipe mount 22 as suggested in FIG. 8. In illustrative embodiments, multi-layer protective coating 10C also covers inner surface of fuel filler pipe 18 as shown in FIG. 8. Protective coating 10C comprises a first coating layer 31L adhered to exterior surface 18E of fuel filler pipe 18 and inner and outer surfaces 22I, 22O of pipe mount and a second coating layer 32L adhered to exposed surfaces of first coating layer 31L as suggested in FIG. 8

Figure 6:
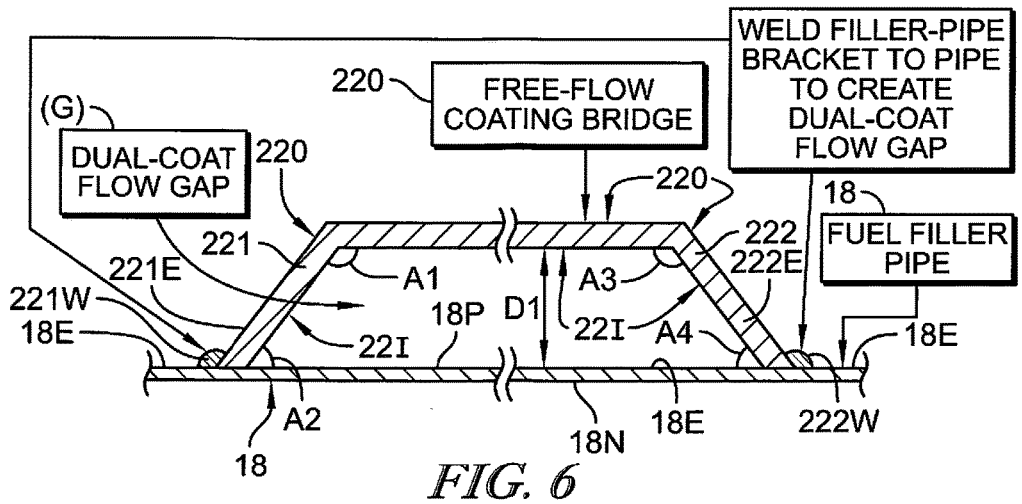
FIGS. 6-8 show a two-stage sequence for applying first and second coating materials to the pipe mount and the fuel filler pipe to establish a first coating layer comprising a zinc-rich primer and a second coating layer comprising an anti-corrosion paint in the dual-coat flow gap formed between the pipe mount and the fuel filler pipe.

Flow gap (G) is sized to allow a zinc-rich primer 31 and a top-coat anti-corrosion paint 32 to flow into flow gap (G) when the primer 31 and paint 32 are applied as suggested in FIGS. 7 and 8 after the filler-pipe anchor bracket 20 has been welded to the fuel filler pipe 18 as suggested in FIG. 6. Another embodiment of a fuel tank fill assembly 210 having an annular filler-pipe bracket 220 that forms a dual-coat flow gap (210G) with a fuel filler pipe 218 is shown in FIGS. 9-12.

Inner surface 22I of pipe mount 22 of coating maximizer filler-pipe anchor bracket 20 and an opposed portion 18P of exterior surface 18E of fuel filler pipe 18 are arranged to lie in confronting spaced-apart relation to one another as shown, for example, in FIGS. 3 and 6. Inner surface 22I and opposed portion 18P cooperate to form therebetween dual-coat flow gap (G) means for first allowing first coating layer 31L to adhere to exposed portions of inner surface 22I of pipe mount 22 and the opposed portion 18P of exterior surface 18E of fuel filler pipe 18 during deposition of first coating layer 31L on pipe mount 22 and fuel filler pipe 18 and thereafter allowing second coating layer 32L to adhere to exposed portions of first coating layer 31L located in a dual-coat flow gap (G) provided between pipe mount 22 and fuel filler pipe 18. An exposed surface of second coating layer 32L located in the dual-coat flow gap (G) cooperates to form an open space (S) located between pipe mount 22 and the opposed portion 18P of exterior surface 18E of fuel filler pipe 18 as suggested in FIG. 8.

Pipe mount 22 includes a coating bridge 220 arranged to lie in spaced-apart relation to the opposed portion 18P of exterior surface 18E of fuel filler pipe 18, a first welding base 221 coupled to a first end of coating bridge 220 and welded to exterior portion 18E of fuel filler pipe 18, and a second welding base 222 coupled to an opposite second end of coating bridge 220 and welded to exterior portion 18E of fuel filler pipe 18 as shown, for example, in FIGS. 3 and 6 to define the dual-coat flow gap (G) between pipe mount 22 and fuel filler pipe 18. Coating bridge 220 and the first and second welding bases 221, 222 cooperate to define inner surface 22I of pipe mount 22 and mate with first coating layer 31L.

Coating bridge 220 is arranged to lie in uniformly spaced-apart relation from the opposed portion 18P of exterior surface 18E of fuel filler pipe 18. First welding base 221 is arranged to cooperate with the first end of coating bridge 220 to define an obtuse included angle A1 therebetween and with the opposed portion 18P of exterior surface 18E of fuel filler pipe 18 to define an acute included angle A2 therebetween as suggested in FIG. 6. Second welding base 222 is arranged to cooperate with the opposite second end of coating bridge 220 to define an obtuse included angle A3 therebetween and with the opposed portion 18P of exterior surface 18E of fuel filler pipe 18 to define an acute included angle A4 therebetween as suggested in FIG. 6.

A first weldment 221W is mated with an exterior surface 221E of first welding base 221 and exterior surface 18E of fuel filler pipe 18. A second weldment 222W is mated with an exterior surface 222E of second welding base 222 and exterior surface 18E of fuel filler pipe 18. First coating layer 31L is adhered to each of the first and second weldments 221W, 222W and has a uniform thickness inside and outside the dual-coat flow gap (G). Second coating layer 32L has a uniform thickness inside and outside of the dual-coat flow gap (G).

An illustrative process for providing a fuel tank fill assembly 10 comprises the steps of forming a dual-coat flow gap (G) between exterior surface 18E of fuel filler pipe 18 and an opposed inner surface 22I of pipe mount 22 when pipe mount 22 is mounted on exterior surface 18E of fuel filler pipe 18 as suggested in FIGS. 3 and 6 during an assembly sequence and applying a multi-layer protective coating 10C to exposed portions of pipe mount 22 and fuel filler pipe 18 after the forming step as suggested in FIGS. 7 and 8.

The coating applying step in accordance with the present disclosure includes the steps of first introducing a first coating material 31 into the dual-coat flow gap (G) to establish a first coating layer 31L located in the dual-coat flow gap (G) and adhered to exterior surface 18E of fuel filler pipe 18 and the opposed inner surface 22I of pipe mount 22 and then introducing a second coating material 32 into the dual-coat flow gap (G) to establish a second coating layer 32L on exposed portions of the first coating layer 31L located in the dual-coat flow gap (G) so that a multi-layer protective coating 10C is present in the dual-coat flow gap (G) on portions of exterior surface 18E of fuel filler pipe 18 and the opposed inner surface 22I of the pipe mount 22 that cooperate to define a boundary of the dual-coat flow gap (G) as suggested in FIG. 8. An open space (S) surrounded by the second coating layer 32L is formed in the dual-coat flow gap (G) during the second introducing step. The first coating material 31 is an undercoat zinc-rich primer and the second coating material 32 is a top-coat anticorrosion paint in illustrative embodiments.

Pipe mount 22 includes first and second welding bases 221, 222 and a coating bridge 220 arranged to extend between and interconnect the first and second welding bases 221, 222. Coating bridge 220 is configured to cooperate with the first and second welding bases 221, 222 to provide the opposed inner surface 221 of the pipe mount 72.

The forming step in accordance with the present disclosure comprises the steps of welding the first welding base 221 to a first portion of exterior surface 18E of fuel filler pipe 18 and welding the second welding base 222 to a second portion of exterior surface 18E of fuel filler pipe 18 to size the dual-coat flow gap (G) defined between the exterior surface 18E of fuel filler pipe 18 and the opposed inner surface 22I on the first welding base 221, coating bridge 220, and second welding base 222 of the pipe mount 22 to receive in the dual-coat flow gap (G), in sequence, a flow of the first coating material 31 that adheres to said exterior surface 18E and opposed inner surface 22I to establish the first coating layer 31L in dual-coat flow gap (G) and thereafter a flow of the second coating material 32 that adheres to exposed portions of the first coating layer 31L in the dual-coat flow gap (G) to establish the second coating layer 32L in the dual-coat flow gap (G). An open space (S) surrounded by portions of the second coating layer 32L associated with each of the first welding base 221, the coating bridge 220, the second welding bridge 222, and said exterior surface 18E of the fuel filler pipe 18 is formed in the dual-coat flow gap (G) during the second introducing step. Coating bridge 220 of pipe mount 22 is coupled to mount-support flange 21 as shown, for example, in FIG. 2.

Dual-coat flow gap (G) is sized to allow zinc-rich primer 31 and top-coat anti-corrosion paint 32 to move into dual-coat flow gap (G). Flow gap (G) is formed to allow zinc-rich primer 31 and top-coat anti-corrosion paint 32 to coat a portion of exterior surface 18E of fuel filler pipe 18 upon application of the zinc-rich primer 31 and the top-coat anti-corrosion paint 32 when filler-pipe anchor bracket 20 is coupled to fuel filler pipe 18. In an illustrative embodiment, dual-coat flow gap (G) has a height D1 as suggested in FIGS. 3 and 6. In an embodiment, height D1 of dual-coat flow gap (G) is at least 0.5 mm. In another embodiment, height D1 is about, or precisely, 0.5 mm. It is contemplated that dual-coat flow gap (G) may be sized to other suitable heights designed to facilitate the flow of primer and/or paint between fuel filler pipe 18 and pipe mount 92.

A fuel tank fill assembly 210 in accordance with a second embodiment of the present disclosure includes a fuel filler pipe 218, a coating maximizer filler-pipe anchor bracket 220 including an annular mount-support flange 221 and an annular pipe mount 222 as shown, for example, in FIGS. 9-12. A multi-layer protective coating 210C (like coating 10C) is applied to fuel filler pipe 218 and filler-pipe anchor bracket 220 in the manner described herein in connection with assembly 10 to cover exposed portions of pipe 218 and bracket 220 and flow into an annular dual-coat flow gap (210G) shown in FIG. 12 and defined in accordance with the present disclosure between fuel filler pipe 218 and annular pipe mount 222 of filler-pipe anchor bracket 220.

Figure 9:
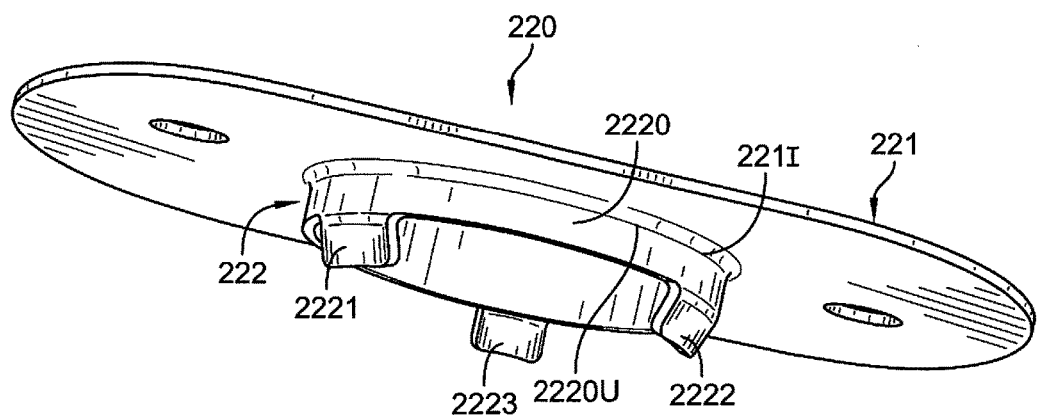
FIGS. 9-12 show another embodiment of a coating maximizer filler-pipe anchor bracket in accordance with the present disclosure along and in combination with a companion fuel filler pipe.
Figure 10:
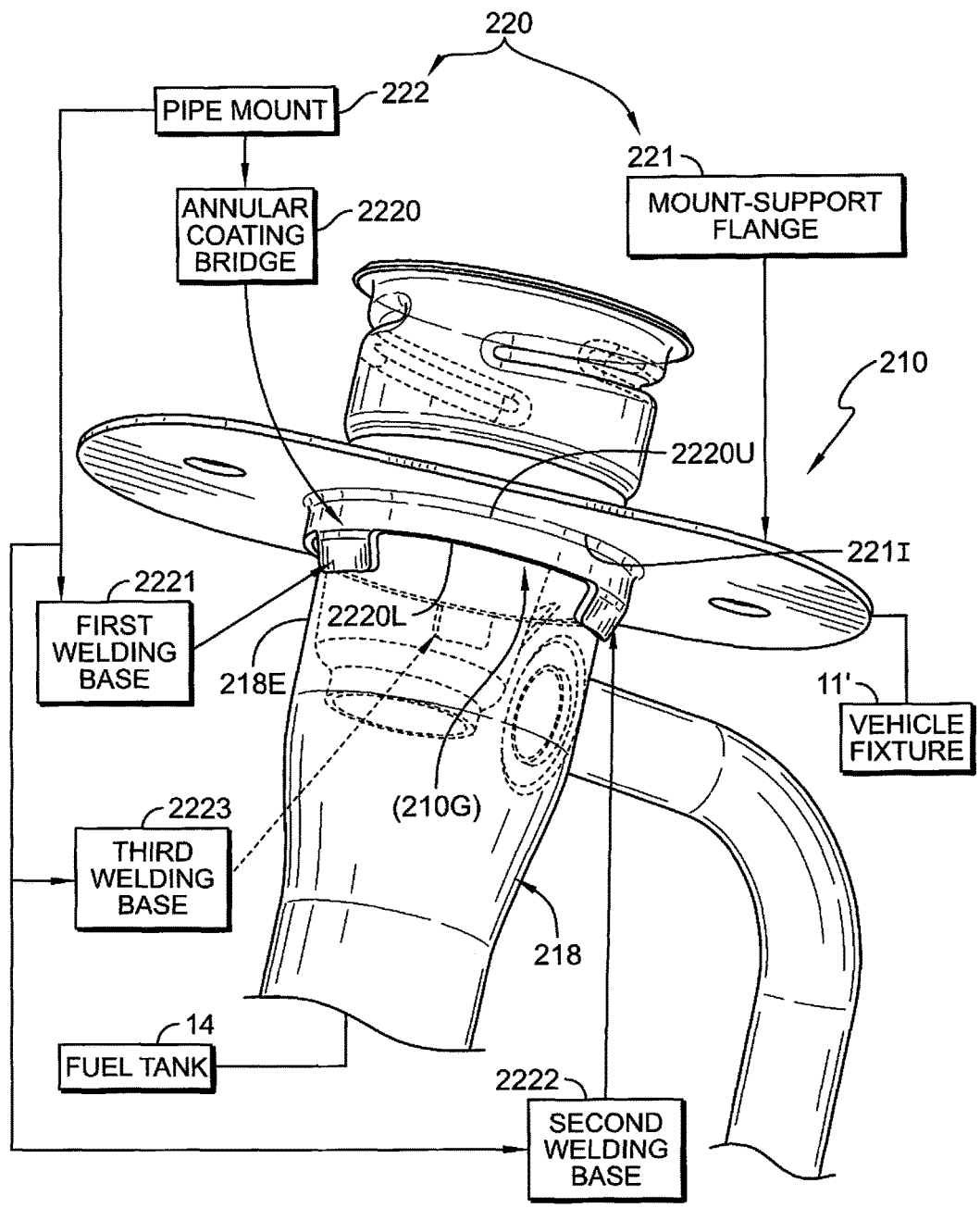
Figure 11:
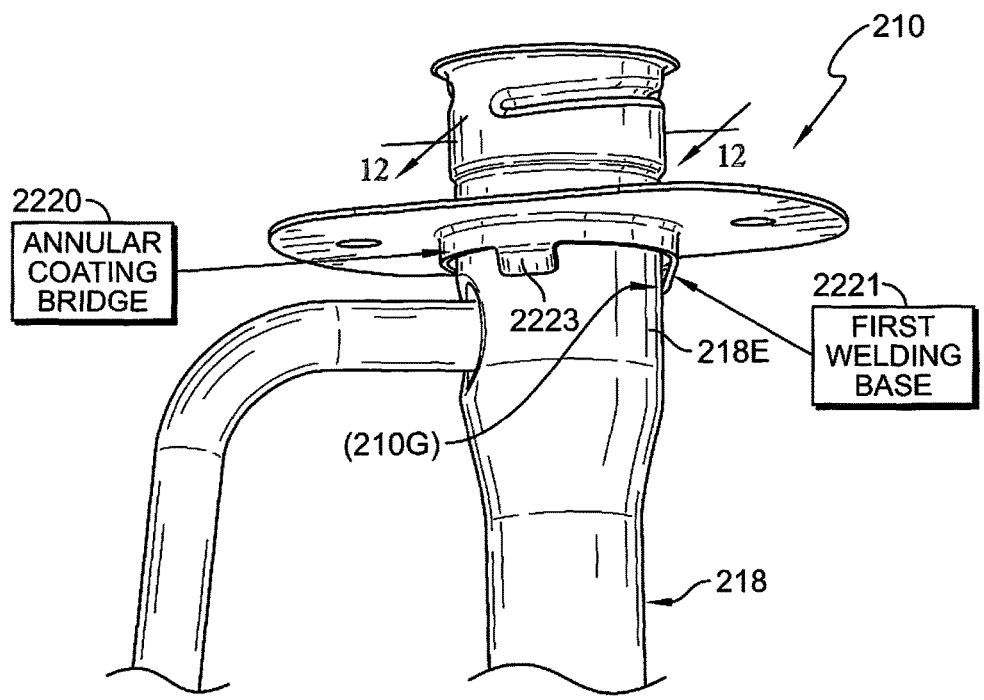
Figure 12:
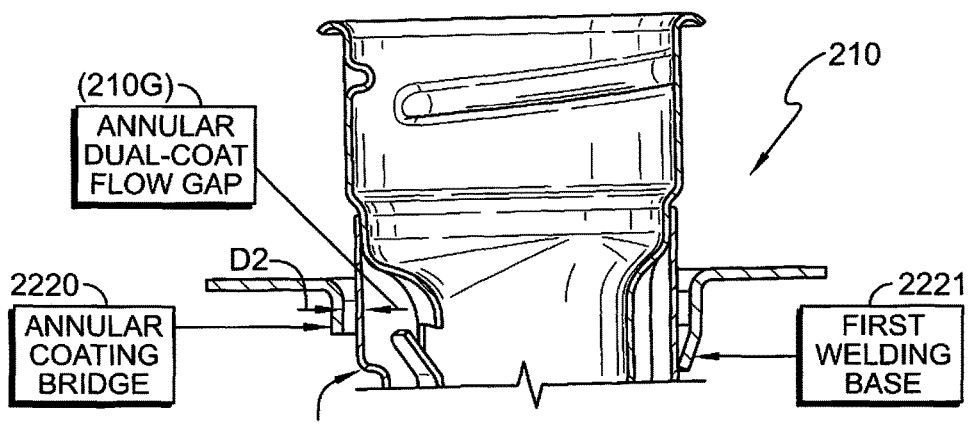

Annular pipe mount 222 includes an annular coating bridge 2220 and first, second, and third welding bases 2221, 2222, and 2223 arranged to depend from a lower annular edge 2220L of coating bridge 2220 and lie in circumferentially spaced-apart relation to one another as suggested in FIGS. 9 and 10. Each welding base 2221-2223 is configured to be welded to an exterior surface 218E of fuel filler pipe 218 to establish an annular dual-coat flow gap (210G) between an inner surface of annular pipe mount 222 and exterior surface 218E of fuel filler pipe 218 as suggested in FIG. 12.

Annular mount-support flange 221 has an inner edge 221I coupled to an upper annular edge 2220U of annular coating bridge 2220 as shown, for example, in FIGS. 9 and 10. Annular mount-support flange 221 is configured to be coupled to a vehicle fixture 11 as suggested in FIG. 10. Flange 221 and pipe mount 222 cooperate to form a monolithic components in illustrative embodiments of the present disclosure.

The coating process described in connection with fuel tank assembly 10 applies to fuel tank fill assembly 210 in accordance with the present disclosure. Protective coating 210C also includes first and second coating layers 31L, 32L.

Inner surface 222I of annular pipe mount 220 cooperates with a portion of exterior surface 218E of fuel filler pipe to form annular flow gap (210G) therebetween as shown in FIG. 10. Annular dual-coat flow gap (210G) is sized to allow a zinc-rich primer and a top-coat anti-corrosion paint to move into annular dual-coat flow gap (210G). Annular dual-coat flow gap (210G) is formed to allow the zinc-rich primer and the top-coat anti-corrosion paint to coat a portion of exterior surface 218E of fuel filler pipe 218 upon application of the zinc-rich primer and the top-coat anti-corrosion paint after annular filler-pipe anchor bracket 220 has been coupled to fuel filler pipe 218. In an illustrative embodiment, annular dual-coat flow gap (210G) has a distance D2 as suggested in FIG. 12 and defined by a portion of interior surface 722I and a portion of exterior surface 218E. In an embodiment, height D2 of annular dual-coat flow gap (210G) is at least 0.5 mm. In another embodiment, height D2 is at least 2 mm. In yet another embodiment, height D2 is about 2 mm. In other embodiments, it is contemplated to use other heights as D2 that are suitably large to allow flow of primer and/or paint into annular dual-coat flow gap (210G).

According to the present disclosure, a bracket design (i.e. filler-pipe anchor bracket 20, 220) can facilitate paint coverage, sometimes complete paint coverage, between the bracket (i.e. filler-pipe anchor bracket 20, 220) and fuel filler pipe 18, 218. Alternative welded bracket designs sit flush against filler pipes, which do not allow paint to wick, coat, and cure properly in the area between the bracket and the filler pipe. The paint (i.e. zinc-rich primer 38 and top-coat anti-corrosion paint 39) is used for corrosion protection, so this area needs to be coated to meet OEM corrosion requirements. Therefore, it may be desirable to provide a gap of >0.5 mm between fuel filler pipe 18, 218 the bracket (i.e. filler-pipe anchor bracket 20, 220), allowing touch points only for welding.

The bracket (i.e. filler-pipe anchor bracket 20, 220) is designed to provide a gap (i.e. dual-coat flow (G), (210G)) of greater than 0.5 mm between fuel filler pipe 18, 218 and the bracket surface (i.e. inner surface 22I, 222I), yet provide touch points for welding. This design may allow paint (i.e. a zinc-rich primer 31, and/or top-coat anti-corrosion paint 32) that is applied (e.g. by a dip process) for corrosion and fuel resistance protection to flow freely under the bracket (i.e. filler-pipe anchor bracket 20, 220) and coat this interface surface (i.e. dual-coat flow gap (G), (210G) completely. The shape of the bracket (i.e. filler-pipe anchor bracket 20, 220) is elevated away from fuel filler pipe 18, 218 in the middle and then is angled down to meet the fuel filler pipe 18, 218 for line contact. These locations are where the welds will be applied.

The invention claimed is:

1. A process for providing a fuel tank fill assembly, the process comprising the steps of forming a dual-coat flow gap between an exterior surface of a fuel filler pipe and an opposed inner surface of a pipe mount when the pipe mount is mounted on the exterior surface of the fuel filler pipe during an assembly sequence, the pipe mount being included in a filler-pipe anchor bracket also having a mount-support flange that is coupled to the pipe mount and adapted to be coupled to a vehicle frame to retain the fuel filler pipe in fixed relation to the vehicle frame, and applying a multi-layer protective coating to exposed portions of the pipe mount and the fuel filler pipe after the forming step, the applying step including the steps of first introducing a first coating material into the dual-coat flow gap to establish a first coating layer located in the dual-coat flow gap and adhered to the exterior surface of the fuel filler pipe and the opposed inner surface of the pipe mount and then second introducing a second coating material into the dual-coat flow gap to establish a second coating layer on exposed portions of the first coating layer located in the dual-coat flow gap so that multi-layer protective coating is present in the dual-coat flow gap on portions of the exterior surface of the fuel filler pipe and the opposed inner surface of the pipe mount that cooperate to define a boundary of the dual-coat flow gap, wherein the pipe mount includes first and second welding bases and a coating bridge arranged to extend between and interconnect the first and second welding bases and configured to cooperate with the first and second welding bases to provide the opposed inner surface of the pipe mount and the forming step comprises the steps of welding the first welding base along a first free end face of the pipe mount that faces the fuel filler pipe to a first portion of the exterior surface of the fuel filler pipe and welding the second welding base along an opposite second free end face of the pipe mount that faces the fuel filler pipe to a second portion of the exterior surface of the fuel filler pipe to size the dual-coat flow gap defined between the exterior surface of the fuel filler pipe and the opposed inner surface on the first welding base, coating bridge, and second welding base of the pipe mount to receive in the dual-coat flow gap, in sequence, a flow of the first coating material that adheres to said exterior surface and opposed inner surface to establish the first coating layer in dual-coat flow gap and thereafter a flow of the second coating material that adheres to exposed portions of the first coating layer in the dual-coat flow gap to establish the second coating layer in the dual-coat flow gap.

2. The process of claim 1, wherein an open space surrounded by the second coating layer is formed in the dual-coat flow gap during the second introducing step.

3. The process of claim 1, wherein the first coating material is an undercoat zinc-rich primer and the second coating material is a top-coat anticorrosion paint.

4. The process of claim 1, wherein an open space surrounded by portions of the second coating layer associated with each of the first welding base, the coating bridge, the second welding bridge, and said exterior surface of the fuel filler pipe is formed in the dual-coat flow gap during the second introducing step.

5. The process of claim 1, wherein the first coating material is an undercoat zinc-rich primer and the second coating material is a top-coat anticorrosion paint.

6. The process of claim 1, wherein the coating bridge of the pipe mount is coupled to the mount-support flange.

7. A fuel tank fill assembly comprising a fuel filler pipe formed to include a nozzle-receiving outer end, a fuel-discharging inner end adapted to be coupled to a fuel tank to discharge fuel into an interior region of a fuel tank to discharge fuel into an interior region of a fuel tank, an interior surface arranged to define a fuel-conducting passageway extending between and interconnecting the nozzle-receiving outer end and the fuel-discharging inner end, and an exterior surface arranged to face away from the fuel-conducting passageway defined by the interior surface, a coating maximizer filler-pipe anchor bracket including a mount-support flange adapted to be coupled to a vehicle frame to support the fuel filler pipe relative to the vehicle frame to cause the fuel-discharging inner end to communicate with the interior region of the fuel tank and a pipe mount coupled to the mount-support flange and to the exterior surface of the fuel filler pipe to retain the mount-support flange in fixed relation to the fuel filler pipe, the pipe mount includes an inner surface facing toward the exterior surface of the fuel filler pipe, and a multi-layer protective coating covering exposed portions of the exterior surface of the fuel filler pipe and inner and outer surfaces of the pipe mount, the multi-layer protective coating comprising a first coating layer adhered to the exterior surface of the fuel filler pipe and inner and outer surfaces of the pipe mount and a second coating layer adhered to exposed surfaces of the first coating layer, and wherein the inner surface of the pipe mount of the coating maximizer filler pipe anchor bracket and an opposed portion of the exterior surface of the fuel filler pipe are arranged to lie in confronting spaced-apart relation to one another and cooperate to form therebetween dual-coat flow gap sized to first allow the first coating layer to adhere to exposed portions of the inner surface of the pipe mount and the opposed portion of the exterior surface of the fuel filler pipe during deposition of the first coating layer on the pipe mount and the fuel filler pipe and thereafter allow the second coating layer to adhere to exposed portions of the first coating layer located in the dual-coat flow gap provided between the pipe mount and the fuel filler pipe, and wherein the pipe mount is made from a sheet of material with a substantially constant thickness and includes a coating bridge arranged to lie in spaced-apart relation to the opposed portion of the exterior surface of the fuel filler pipe, a first welding base coupled to a first end of the coating bridge that extends to a first free end face of the pipe mount that faces the exterior portion of the fuel filler pipe for line contact and is welded to the exterior portion of the fuel filler pipe, and a second welding base coupled to an opposite second end of the coating bridge that extends to a second free end face of the pipe mount that faces the exterior portion of the fuel filler pipe for line contact and is welded to the exterior portion of the fuel filler pipe to define the dual-coat flow gap between the pipe mount and the fuel filler pipe.

8. The fuel tank filler assembly of claim 7, wherein an exposed surface of the second coating layer located in the dual-coat flow gap cooperates to form an open space located between the pipe mount and the opposed portion of the exterior surface of the fuel filler pipe.

9. The fuel filler assembly of claim 7, wherein the coating bridge and the first and second welding bases cooperate to define the inner surface of the pipe mount and mate with the first coating layer.

10. The fuel tank filler neck assembly of claim 9, wherein the coating bridge is arranged to lie in uniformly spaced-apart relation from the opposed portion of the exterior surface of the fuel filler pipe, the first welding base is arranged to cooperate with the first end of the coating bridge to define an obtuse included angle therebetween and with the opposed portion of the exterior surface of the fuel filler pipe to define an acute included angle therebetween, and the second welding base is arranged to cooperate with the opposite second end of the coating bridge to define an obtuse included angle therebetween and with the opposed portion of the exterior surface of the fuel filler pipe to define an acute included angle therebetween.

11. A fuel tank fill assembly comprising
a fuel filler pipe formed to include a nozzle-receiving outer end, a fuel-discharging inner end adapted to be coupled to a fuel tank to discharge fuel into an interior region of a fuel tank to discharge fuel into an interior region of a fuel tank, an interior surface arranged to define a fuel-conducting passageway extending between and interconnecting the nozzle-receiving outer end and the fuel-discharging inner end, and an exterior surface arranged to face away from the fuel-conducting passageway defined by the interior surface, a coating maximizer filler-pipe anchor bracket including a mount-support flange adapted to be coupled to a vehicle frame to support the fuel filler pipe relative to the vehicle frame to cause the fuel-discharging inner end to communicate with the interior region of the fuel tank and a pipe mount coupled to the mount-support flange and to the exterior surface of the fuel filler pipe to retain the mount-support flange in fixed relation to the fuel filler pipe, the pipe mount includes an inner surface facing toward the exterior surface of the fuel filler pipe, and a multi-layer protective coating covering exposed portions of the exterior surface of the fuel filler pipe and inner and outer surfaces of the pipe mount, the multi-layer protective coating comprising a first coating layer adhered to the exterior surface of the fuel filler pipe and inner and outer surfaces of the pipe mount and a second coating layer adhered to exposed surfaces of the first coating layer, and wherein the inner surface of the pipe mount of the coating maximizer filler pipe anchor bracket and an opposed portion of the exterior surface of the fuel filler pipe are arranged to lie in confronting spaced-apart relation to one another and cooperate to form therebetween dual-coat flow gap means for first allowing the first coating layer to adhere to exposed portions of the inner surface of the pipe mount and the opposed portion of the exterior surface of the fuel filler pipe during deposition of the first coating layer on the pipe mount and the fuel filler pipe and thereafter allowing the second coating layer to adhere to exposed portions of the first coating layer located in a dual-coat flow gap provided between the pipe mount and the fuel filler pipe, wherein the pipe mount includes a coating bridge arranged to lie in spaced-apart relation to the opposed portion of the exterior surface of the fuel filler pipe, a first welding base coupled to a first end of the coating bridge and welded to the exterior portion of the fuel filler pipe, and a second welding base coupled to an opposite second end of the coating bridge and welded to the exterior portion of the fuel filler pipe to define the dual-coat flow gap between the pipe mount and the fuel filler pipe, and wherein a first weldment is mated with only an exterior surface of the first welding base and the exterior surface of the fuel filler pipe, a second weldment is mated only with an exterior surface of the second welding base and the exterior surface of the fuel filler pipe and the first coating layer is adhered to each of the first and second weldments and has a uniform thickness inside and outside the dual-coat flow gap.

12. The fuel tank filler neck of claim 7, wherein the second coating layer has a uniform thickness inside and outside of the dual-coat flow gap.

* * * * *